United States Patent [19]
Limes et al.

[11] 3,879,209
[45] Apr. 22, 1975

[54] PROCESS FOR PREPARING FAST-SETTING AGGREGATE COMPOSITIONS AND PRODUCTS OF LOW POROSITY PRODUCED THEREWITH

[75] Inventors: Robert W. Limes, Seven Hills; Robert O. Russell, Fairview Park, both of Ohio

[73] Assignee: Republic Steel Corporation, Cleveland, Ohio

[22] Filed: June 29, 1973

[21] Appl. No.: 374,969

Related U.S. Application Data

[63] Continuation-in-part of Ser. No. 203,835, Dec. 1, 1971, abandoned.

[52] U.S. Cl. .................. 106/58; 106/85; 100/121
[51] Int. Cl. ........................................... C04b 35/04
[58] Field of Search ............. 106/58, 85, 105, 121

[56] References Cited
UNITED STATES PATENTS

| | | | |
|---|---|---|---|
| 3,285,758 | 11/1966 | Limes et al. | 106/58 |
| 3,413,385 | 11/1968 | Komac et al. | 106/58 |

*Primary Examiner*—J. Poer
*Attorney, Agent, or Firm*—Cooper, Dunham, Clark, Griffin & Moran

[57] ABSTRACT

The process disclosed herein comprises a method for making quick-setting roadways, sidewalks and other constructions; for filling cracks, crevices and spalled areas in roadways, sidewalks, walls, etc.; and for making other repairs or installations for which concrete has generally previously been used by which method the forms for laying the roadway, etc., or the cracks, crevices and faulty areas are filled with a phosphate-bonded magnesia composition which attains high strength with extremely low porosity after setting at ambient temperature for only a few minutes. This composition comprises an aggregate of 1–100 percent, preferably 10–50 percent magnesia mixed for chemical bonding with a solution of ammonium phosphate containing orthophosphates, pyrophosphate and polyphosphates, which polyphosphates include tripolyphosphate and higher polyphosphates.

10 Claims, No Drawings

PROCESS FOR PREPARING FAST-SETTING AGGREGATE COMPOSITIONS AND PRODUCTS OF LOW POROSITY PRODUCED THEREWITH

This application is a continuation-in-part of application Ser. No. 203,835, filed Dec. 1, 1971 (now abandoned).

BACKGROUND OF THE INVENTION

1. Field of the Invention

This invention relates to a process for making and repairing roadways, sidewalks and other constructions and repairs using a quick-setting composition capable of developing great strength and very low porosity within a matter of a few minutes. More specifically, it relates to a process for making and repairing roadways, etc., or as a quick-setting mortar using a phosphate-bonded magnesia-aggregate composition which sets to great strength with extremely low porosity within a few minutes and thereby allows the new or repaired roadway, etc., to be put into service in a very short time. Still more specifically, it relates to a process of repairing roadways, etc., with a composition comprising a magnesia-aggregate wetted with a solution of ammonium phosphates which produces a phosphate bonded aggregate in a very short time.

2. Related Prior Art

According to present practice, new concrete roadways require a setting period of at least several days before sufficient strength is developed to permit use. Moreover, repair of roadways, walls, etc., presently comprises filling cracks and crevices or spalled areas with a tar material which can be heated to soften, and then spread, poured or sprayed into the cracks, crevices or other damaged area and allowed to cool and harden. In many cases crushed stone or gravel is mixed or pressed into the tar as a filler or to give added strength.

U.S. Pat. No. 3,285,758 is related to refractory compositions prepared from refractory and ammonium phosphate mixtures somewhat similar to those used in the present invention. However, the refractory compositions are dried at temperatures above 250° F. and preferably at at least 350° F. However, as shown in the patent, such drying operations produce products having porosities generally in the range of 20-25 percent. Such products are unsatisfactory as substitutes for concrete roadways, sidewalks and other constructions or for repair of the same since the porosity would be fatal in the freeze-thaw conditions to which roadways, sidewalks, etc. are exposed. For refractory purposes such porosities are not harmful and in fact are considered advantageous for heat insulation, etc.

U.S. Pat. No. 3,413,385 discloses the same type of refractory compositions as in the above patent, but is specific to a process of gunning such mixtures onto an interior wall of a coke oven while the refractory bricks of the coke oven wall are at a temperature of at least 1200° F. Here again, high porosities are obtained in the refractory product. The temperatures used in these cases are designed for fast removal of the water content with accompanying high porosity which gives good heat insulation properties in the refractory. However, as emphasized hereinafter, porosity in such products is not desirable in a product to be substituted for concrete roadways, sidewalks, etc., or for repair of the same.

STATEMENT OF THE INVENTION

In accordance with the present invention, it has now been found that new roadways, sidewalks and other constructions can be made, and roadways, walls and other constructions having cracks, crevices and spalled areas therein can be patched by a process in which phosphate-bonded aggregate compositions are applied to fill roadway and other forms or cracks, crevices, etc., and allowed to set at ambient temperature. Surprisingly it has been found that the phosphate-bonded aggregate hardens and sets to such great strength at normal temperatures in a very short period and thereby permits use of the roadways, sidewalks, etc., within a few minutes. Consequently, such a process involves very little shut down time for vehicle traffic, etc., and gives new or patched roadways, etc., of great strength in a very short time.

In contrast to the refractory compositions of high porosity produced by drying at 250° F. or higher, preferably above 350° F., it has now been found that products of very low porosity, that is less than 5 percent and generally less than 2 percent, preferably less than 1 percent, are produced by effecting the setting at less than 212° F., advantageously at 20°–150° F., and preferably at about 50°–90° F. Since the phosphate solution freezes at much lower temperatures than water, and the process of this invention is operative at temperatures below the freezing point of water, it is possible to use the compositions of this invention and to make repairs in cold weather.

It has been found that, in addition to the much lower porosity, the drying operation of the prior art, at 250° F. or higher, produces a considerable lowering of strength in the ultimate strength based on comparable mixes. For example, the working examples recited hereinafter show that for identical samples from a particular mixture, the following crushing strengths are obtained under the following setting conditions:

a. After setting for 2 hrs. at room temp . . . 2850 psi
b. After setting for 3 days at room temp . . . 3210 psi (0.5 percent porosity)
c. After setting for 2 hrs. at room temp; drying at 250° F. for 16 hrs., and then setting again at room temp for a total period of 3 days . . . 2335 psi (10.9 percent porosity)
d. After setting for 7 days at room temp . . . 3810 psi
e. After setting for 28 days at room temp . . . 5000 psi In addition to the improvements in lower porosity and greater strength effected by the setting at lower temperatures, it is found that the compositions produced according to the process of this invention have much greater adhesion to ordinary concrete and other materials. For example, tests have shown that when the fast-setting concrete of this invention is adhered to ordinary concrete and allowed to set for a substantial period, attempts to break the fast-setting concrete away from the original ordinary concrete generally result in breakage of the original ordinary concrete.

In view of the fast setting of the composition, the magnesia aggregate is mixed with a solution of the ammonium phosphates just prior to application. This mixing can be effected in a "gun" which mixes and shoots the resultant mixture into the repair area. According to this method, the aggregate is carried in an airstream to a nozzle where it is mixed with the phosphate solution, and the wetted, resultant mixture is blown to the repair area. It is also suitable to mix the various components on a pug mill or other device adapted to mix the ammonium phosphate solution and the aggregate.

In such case the resultant mixture can be cast, rammed or troweled. With such mixes it is not found necessary to apply heat in order to effect a very fast setting and the heat generated by the setting reaction is not sufficient to cause fast vaporization of moisture which might otherwise cause fissures, ruptures and bubbles.

Where large volumes of material are to be prepared, regular concrete mixers can be used for uniform mixing of the dry aggregate and the phosphate solution withheld until just prior to placing the mix in the forms for shaping into the roadway, sidewalk, or other construction. After the phosphate solution is added, the mix must be dumped into the forms almost immediately to avoid premature setting. In some cases it is advantageous to transfer the dry mix in increments to a smaller mixer for addition of and mixing with the phosphate solution.

Before the resultant mix has time to set it is placed into the form or mold defining the shape in which the mix is to be hardened. This can be a form for shaping into a roadway, sidewalk, wall, etc., or it can be the walls of a crack or crevice or spalled area which is to be repaired.

Particularly preferred as the ammonium phosphate mixture are aqueous solutions containing as much ammonium polyphosphate as can be dissolved. While the polyphosphate content gives a higher content of $P_2O_5$ in the resultant mixture, it has been found that the ammonium component is also essential since phosphorous oxide components alone, such as phosphorous pentoxide, do not give the beneficial results effected by the practice of this invention. It has been found that the ammonium phosphate mixture advantageous for the purpose of this invention has the composition of no more than about 40 percent, generally approximately 35-40 percent orthophosphate, and at least 60 percent of non-orthophosphates. The non-orthophosphates generally comprise about 87-98 percent pyrophosphate and 2-13 percent high polyphosphates. On the basis of the overall $P_2O_5$ contents, the non-orthophosphates comprise 52-63 percent pyrophosphate, 1-11 percent tripolyphosphate and 0-5 percent higher polyphosphates. Such compositions show about 8-12 percent ammoniacal nitrogen and about 30-38 percent total $P_2O_5$.

In the quick-set compositions of this invention the magnesia content can range from 10 to 50 percent by weight of the aggregate portion and the phosphate content (calculated as $P_2O_5$ content) in the developed composition can range from 3 to 10, preferably from 7 to 10 parts of $P_2O_5$ per 100 parts of aggregate.

The ammonium phosphate solution useful in the practice of this invention can be prepared by the reaction of polyphosphoric acid with concentrated ammonium hydroxide. The polyphosphoric acid is 115 percent phosphoric acid and has a $P_2O_5$ content of approximately 83.2 percent. This is distributed as 5 percent orthophosphoric acid, 16 percent pyrophosphoric acid, 17 percent triphosphoric acid, 16 percent as tetraphosphoric acid and 46 percent higher polymer acid. The polyphosphoric acid can be represented by the formula

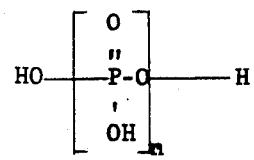

When $n$ equals 1, this formula represents orthophosphoric acid. When $n$ equals 2, the formula represents pyrophosphoric acid. When $n$ equals 3, it represents triphosphoric acid. When $n$ equals 4, it represents tetraphosphoric acid, and when $n$ is higher than 4, it represents the higher polymer acids.

When the ammonium hydroxide is reacted with this polyphosphoric acid, some of the hydroxy groups of this formula are converted to $-ONH_4$ radicals. Since the water present in the ammonium hydroxide solution converts some of the polymeric acid to the ortho and pyro forms, the ratios of these forms in the ammonium phosphate product becomes higher than in the initial acid form. For most of the purposes of this invention it is desirable to have as high as possible the concentration of ammonium polyphosphates. The various ammonium phosphates can be represented by substituting the ammonium radical ($NH_4$) for the H of one or more of the hydroxy groups shown in the formula.

For example, if approximately 41 parts of the polyphosphoric acid (115 percent $H_3PO_4$) is reacted with approximately 73 parts of 35 percent ammonium hydroxide, the resultant ammonium phosphate solution has a $P_2O_5$ content of approximately 34 percent, an ammoniacal nitrogen content of approximately 10 percent, and a water content of approximately 50 percent. Some of the water has been used to break down the polymer structure and give higher proportions of the orthophosphoric acid and pyrophosphoric structures than were present originally. The concentrations are approximately those cited above as suitable for the practice of this invention.

The indicated ratios of the various components of the above-indicated solution are in equilibrium at the concentration described. However, while the above concentrations are desirable for most purposes in the practice of this invention such as in aggregate mixes to be used for casting and ramming, it is generally desirable when the mix is to be applied by gunning that additional phosphate solution be present to give a more suitable consistency for this type of application. For most gunning operations the addition of the higher proportions of phosphate solution in the indicated range is satisfactory.

For purpose of simplification, the amount of ammonium phosphate solution desirable for the purpose of this invention is generally indicated as 10-30 parts of solution per 100 parts of aggregate, preferably 15-25 parts of solution. This is based on a $P_2O_5$ content of approximately 34.2 percent in the ammonium phosphate solution. When the $P_2O_5$ content varies from the 34.2 value, the amount of solution is adjusted to give the equivalent $P_2O_5$ content, or advantageously an even higher $P_2O_5$ content, provided the volume of solution is not increased to give more than the desired amount of fluidity or consistency. A practical range can also be stated as being the equivalent to about 3-10, preferably 6.5-10, parts by weight of $P_2O_5$ content per 100 parts of aggregate.

Particularly suitable ammonium phosphate for the purpose of this invention is a commercial product known as sequestered phosphatic solution (SPS), which is used primarily as agriculture fertilizer. Such solutions contain orthophosphate, pyrophosphate and polyphosphates. A typical analysis shows 10.2 percent ammoniacal nitrogen, and 34.2 percent total $P_2O_5$. The $P_2O_5$ distribution is approximately 38 percent as orthophosphate, 48 percent as pyrophosphate, 10 percent as tripolyphosphate, 3 percent as tetrapolyphosphate and 1 percent as higher polyphosphates.

This commercial material has approximately 4 percent of impurities, which do not adversely affect its use in the practice of this invention. These impurities comprise approximately 1.7 percent sulfuric acid, 0.6 percent iron, 0.5 percent aluminum and 0.05 percent fluorine. This commercial product also contains roughly about 50 percent water.

As previously indicated, it is generally desirable to use the ammonium phosphate mixture in as high a concentration as convenient. Therefore, in using the commercial SPS material, it is generally desirable to use it without dilution and to use it in a proportion which will give an appropriate consistency for the particular method by which it is to be applied. For example, for casting with an aggregate mix of 80 percent No. 8 dolomite and 20 percent fine magnesia, the optimum proportion is found to be about 7.5 parts of $P_2O_5$ per 100 parts of aggregate. Using an SPS of about 34 percent $P_2O_5$ this requires about 22 parts by weight of the SPS per 100 parts of aggregate. With an aggregate of greater fineness or smaller particle size, a greater amount of SPS may be required to give the preferred consistency whereas with an aggregate of larger particle size less SPS may be required to produce a preferred consistency.

When crushed brick aggregate is used, a typical satisfactory composition is made by using 50-99 parts of graded brick aggregate, 1-50 parts of lightly calcined or dead-burned magnesia and 15-25 parts of the sequestered phosphate solution. In such compositions, the rate of setting is controlled by the degree of calcination and the fineness of the magnesia. The appropriate amount of sequestered phosphate solution is determined somewhat on the forming technique to be used, a lower percentage being used for ramming and a higher percentage for gunning, both within the range specified.

In compositions in which graded raw dolomite is used, typical suitable compositions are in the range of 50-90 parts of graded raw dolomite, 10-50 parts of lightly calcined or dead-burned magnesia, and 10-25 parts of the sequestered phosphatic solution per 100 parts of aggregate. As previously pointed out, higher magnesia additions improve the properties developed in these compositions, but economics determine that as low a proportion should be used as will give the desired properties.

In both of the above types of compositions, other aggregates can be substituted for either the crushed brick or the raw dolomite, such as limestone, gravel, crushed rock, gannister, etc.

Although magnesia is preferred, it is possible to substitute calcined dolomite, which has a substantial magnesia content, for the magnesia or for a part of the magnesia. Sometimes the calcined dolomite reacts to give off heat. However, if desired, this can be controlled by having present in the mixture sufficient relatively inert aggregate, such as raw dolomite, for dissipation or absorption of the heat.

When such combinations are used, preferred ranges are 10-50 percent of calcined dolomite and 50-90 percent raw dolomite or other inert or relatively inert aggregate. With such combinations, 15-25 parts of sequestered phosphatic solution is advantageously used per 100 parts of aggregate.

Moreover, where references are made above to preferred proportions of magnesia, etc., it has been pointed out above that the advantages of this invention can be had with any aggregate mixture in which there is at least one percent of reactive magnesia, either as such or as a component, such as in calcined dolomite referred to above.

The compositions of this invention set hard within a few minutes, generally about 4-5 minutes, merely upon mixing and need no special conditions or treatment for setting to hardness.

The particle size of the aggregate is not critical and is selected according to the particular ultimate density and other properties desired, type of materials being used and the ultimate use or method of application. Where the composition is to be applied as a gunning mix, the aggregate is obviously selected as of appropriate size to flow easily through the gun.

However, particularly suitable for gunning operations has been found to be a particle size distribution of the aggregate of 60 percent in the range of 6 to +28 mesh (Tyler) and 40 percent of −100 mesh. For casting, ramming or pressing a particle size distribution of 10 percent of −3 to +6 mesh, 55 percent of −6 to +28, and 35 percent of −100 mesh has been particularly suitable. These are the particle sizes used in the examples given below except where indicated otherwise. It is generally permissible to have 5-15 percent of aggregate in the intermediate size range or even 5 percent or more of a size larger than the maximum size indicated.

In preparing mixes of the various ingredients to produce compositions suitable for the practice of this invention, the phosphate solution is added in sufficient amounts to "temper" the mixture for casting or troweling, particularly for putting the composition into cracks or crevices or spreading over spalled areas.

In many cases, as pointed out above, it is desirable to apply coatings for repair purposes of "gunning" a mix onto the area to be repaired. Standard "guns" are available in the industry for this purpose. Obviously, since fast-setting mix must be applied immediately upon mixing with water, "guns" have been developed and are available commercially which are capable of mixing water or other liquid with a dry mix just prior to shooting the resultant wet mix to the desired areas. If the setting agent acts too quickly, the mix will harden in the gun. The sequestered phosphatic solutions are used as the liquid in the gunning operation.

For the practice of this invention, gunning conditions and techniques normally used for such purposes are found satisfactory. Typical of such conditions and techniques are those described in U.S. Pat. No. 3,047,411.

In the present invention it has been found appropriate to substitute the phosphate solution in place of the water and thereby have the phosphate mixed with the dry components just at the instant at which the mix is shot from the gun. This has been found to work most satisfactorily and various fillings and coatings of this invention can be applied in such a manner. Stainless and other steels resistant to corrosion in the presence of the phosphate solution are advantageously used in the manufacture of the gun chambers.

It is generally desirable to use the aggregate components in at least two different grain sizes so that the resultant mixture can be obtained in the maximum packing density. Such graded grain sizes of both magnesia and raw dolomite are available commercially. The magnesia can be a high grade magnesia, or a reclaimed basic refractory containing reactive magnesia. Particularly suitable is dead-burned refractory grade magnesia.

In the present invention, the magnesia in the aggregate reacts with the ammonium ortho, pyro and polyphosphates to produce chemical bonding. This phosphate bonding can be accomplished with either lightly calcined or dead-burned magnesia. As is well known in the industry, dead-burning is effected by calcining above 2700° F. and light burning or light calcining is effected at about 1800°–2000° F. Dead-burned magnesia is often referred to as a periclase.

The particle size of the aggregate is not critical and is selected according to the particular ultimate density and other properties desired, the types of materials being used and the ultimate use or method of application. For example, for troweling, ramming or casting, a particle size distribution of 10 percent of −3 to +6 mesh (Tyler), 55 percent of −6 to +28 and 35 percent of −100 mesh has been particularly suitable. These are the particle sizes used in the examples given below except where indicated otherwise. It is generally permissible to have a small portion of the aggregate in the intermediate size range or a small portion of a larger size than the maximum size indicated. In the aggregate mixture only enough liquid is used to provide lubricity for application.

For optimum bonding, it is desirable to have at least 12 percent, preferably at least 15 percent of SPS (based on 34–37 percent ammonium phosphate solution) in the ultimate mixture. Depending on the particle size of the aggregate the amount of SPS necessary to give the mix the desired consistency will vary accordingly. With smaller particle sizes greater amounts of SPS are required to give the desired consistency because of the greater surface areas involved. Since the MgO and the SPS are the more expensive components of the mix, it is desirable not to use much more of these components than is necessary to give the desired properties. Optimum results are obtained with 12–50 percent, preferably 15–35 percent of MgO, free or easily accessible for reaction, and 8–27 percent, preferably 19–27 percent of SPS. The balance is made up of inert fillers such as dolomite, limestone, gravel, crushed rock, etc.

In quick setting mortar such as desired for grouting or filling in between machinery and a supporting base, a finer grain size of aggregate is preferred which requires more SPS, such as 19–27 percent, as compared to a more coarse grain size used in making concrete or in patching and repair work which advantageously uses 12–20 percent, preferably 15–18 percent SPS.

In order to produce a more dense or compact mix it is often desirable to tamp or vibrate the mixture before using. As previously indicated, the mixing may be effected on a pug mill or other suitable device. It is also possible to effect the mixing simultaneously with application such as with a "gun," the SPS and aggregate being fed by separate feed lines to the mixing chamber and gunned directly therefrom to the repair areas. In gunning mixes a larger amount of SPS may be used, than in other types of mixes, to give easier flow through the gun.

As previously indicated, the fast setting MgO-SPS compositions of this invention can set within two hours to a hardness requiring 24–48 hours set time with present concrete mixes. Moreover, the ultimate strength characteristics upon long standing are comparable to concrete or at least sufficient to give satisfactory service for the desired purposes.

In addition to the construction and repair uses described above, the quick-setting compositions of this invention can be used for many other purposes including the setting of posts for fences and guard rails, setting of bolts in floors, setting of metal railing on concrete bridges, etc.

The invention is best illustrated by the following examples. These examples are intended merely by way of illustration and are not intended in any way to restrict the scope of the invention or the manner in which it can be practiced. Throughout the examples and throughout the specification, unless specifically provided otherwise, parts and percentages are given as parts by weight and percentages by weight. In the following examples the total aggregate represents 100 parts and the various ammonium phosphate solutions represent the number of parts added to the 100 parts of aggregate.

EXAMPLE I

A mix is prepared using a coarse limestone (Presque Isle limestone) of one-eighth to three-eighth inch size and a fine sized dolomite to achieve a good packing density together with MgO and SPS in the proportions indicated below. The MgO is a refractory grade magnesia. The screen analysis (Tyler) for the MgO and for the dolomite are given below. The SPS (sequestered polyphosphate solution) is a commercial product having 10.2 percent ammoniacal nitrogen, 34.2 percent total $P_2O_5$ and about 50 percent water. The $P_2O_5$ distribution is approximately 38 percent as orthophosphate, 48 percent as pyrophosphate, 10 as tripolyphosphate, 3 percent as tetrapolyphosphate and 1 percent as higher polyphosphates.

| Mesh Size | Screen Analysis of Magnesia % | Accum. % |
|---|---|---|
| 65 | 8.3 | 8.3 |
| 100 | 8.7 | 17.0 |
| 150 | 7.0 | 24.0 |
| 200 | 10.6 | 34.6 |
| 325 | 65.0 | 99.6 |
| Pan | 0.4 | 100.0 |

| Mesh Size | Screen Analysis of No. 8 Dolomite % | Accum.% |
|---|---|---|
| 8 | — | — |
| 10 | 7.3 | 7.3 |
| 14 | 22.0 | 29.3 |
| 20 | 22.6 | 51.9 |
| 28 | 14.1 | 66.0 |
| 35 | 10.7 | 76.7 |
| 48 | 6.0 | 84.7 |
| 65 | 5.1 | 89.8 |

-Continued

Screen Analysis of No. 8 Dolomite

| Mesh Size | % | Accum.% |
|---|---|---|
| 100 | 4.3 | 94.1 |
| 150 | 2.1 | 96.2 |
| 200 | 1.8 | 98.0 |
| −200 | 2.0 | 100.0 |

The mixing is effected in a dough mixer of about 10 lbs. capacity. The aggregate is mixed dry until the various sized particles are uniformly mixed. Then the SPS is added and mixing is continued for about 30 seconds. A sample of the mix is poured into paper cups and the initial set is determined by squeezing the cup and noting the time elapsed before there is no "give" in the material when squeezed. The time for hardness to set in is determined by pressing a round bottomed cup into the surface of the casting and determining the time elapsed before sufficient hardness has developed to prevent an indentation. The type of bond is determined visually by pressing a pointed object into the surface of the material to determine the ease or difficulty in prying portions or particles from the mass. The following table gives the proportions and the results obtained:

| | |
|---|---|
| Presque Isle Limestone | 60 parts |
| No. 8 Dolomite | 25 parts |
| Magnesia | 15 parts |
| SPS | 15 parts |
| Type of Bond | Good |
| Set Time (Minutes): | |
| Initial | 5 |
| Hard | 9 |
| Cold Crushing (psi) After: | |
| 30 min. | 1890 |
| 1 hr. | 1975 |
| 2 hr. | 3400 |
| 24 hr. | 3555 |
| 7 days | 4910 |
| 30 days | 5225 |

The cold crushing test is performed by casting test pieces of 2¼ inch diameter and 3 to 3¼ inch height and testing according to ASTM Test No. 133–55 with 1780 lbs. per sq. in. per minute.

This composition is also applied to an opening in a concrete roadway having an area of 2 feet by 3 feet and a depth of 6 inches, and the surface troweled even with the roadway. Within 10 minutes it hardens to sufficient strength to withstand the stresses of traffic passing thereover.

EXAMPLE II

A mixture of 85 parts of the fine sized dolomite and 15 parts of the magnesia is prepared and fed into a "gun" by an airstream while SPS is fed into the mixture chamber at a rate of 20 parts of SPS per 100 parts of aggregate. The resultant mixture is gunned into an opening in a concrete roadway, leveled off with a trowel and allowed to set. After 9 minutes the filler has hardened and has acquired sufficient strength to withstand the pressure of vehicle traffic.

EXAMPLE III

The procedure of Example I is repeated a number of times in larger amounts using the proportions of Example I and using the resulting larger amount to fill a roadway form to give a roadway having the fast-set and hardness described in Example I. The composition sets to a cold crushing value of over 3000 psi within 2 hours as compared to the 24 hours or more required by ordinary concrete to reach this value.

EXAMPLE IV

A quick setting mortar is prepared according to the procedure of Example I except that the mix is hand tamped 20 times to obtain greater density and using the proportions of components and obtaining the results tabulated below:

| | |
|---|---|
| Presque Isle Limestone (−6 to +28 mesh) | 56.7 parts |
| Presque Isle Limestone (−100 mesh) | 28.3 parts |
| Magnesia | 15 parts |
| SPS | 15 parts |
| Set Hard | 9 minutes |
| Cold Crush (after 24 hours) | 3625 psi |

The cold crush test is performed as described in Example III. When tested as a grouting mortar under machinery set on a concrete base, this composition hardens within 10 minutes to a very strong supporting material.

EXAMPLE V

The procedure of Example I is repeated twice with the proportions and components tabulated below. In each case a fast setting hard composition is produced as in Example I:

| | | |
|---|---|---|
| Gravel | 40 parts | 40 parts |
| No. 8 Dolomite | 25 parts | 20 parts |
| Magnesia | 15 parts | 20 parts |
| SPS | 20 parts | 20 parts |

EXAMPLE VI

The procedure of Example I is repeated a number of times resulting in very good strength characteristics using the following proportions of components:

| | |
|---|---|
| Presque Isle Limestone (parts) | 50 |
| No. 8 Dolomite (parts) | 25 |
| Crushed Brick (60% MgO) (parts) | 25 |
| SPS (parts) | 15 |

EXAMPLE VII

The process of Example I is repeated to prepare a mix of 80 percent No. 8 dolomite and 20 percent fine magnesia which is tempered with 22 parts of 34 percent SPS per 100 parts of aggregate. This gives a mix of 7.5 parts of $P_2O_5$ equivalent per 100 parts of aggregate. This mix is cast into a number of cylinders which are treated and tested as follows:

| | | Crushing Strength | Porosity |
|---|---|---|---|
| (A) | After setting for 2 hrs. at room temp. | 2850 psi | — |
| (B) | After setting for 3 days at room temp. | 3210 psi | 0.5% |
| (C) | After setting for 2 hrs. at room temp.; then drying at 250° F. for 16 hrs.; and then set at room temp. up to a total of 3 days | 2335 psi | 10.9% |
| (D) | After setting for 7 days at room temp. | 3810 psi | — |
| (E) | After setting for 28 days at room temp. | 5000 psi | — |

It will be noted that the drying operation has adversely affected the strength (2335 psi) to the extent that it has lost strength compared to what the product has after only 2 hrs. setting at room temperature (2850 psi); even though the dried sample is thereafter allowed to set at room temperature for an additional period to a total of 3 days. In contrast, the undried samples gain strength as the setting period at room temperature is extended, namely 3210 psi for 3 days; 3810 psi for 7 days; and 5000 psi for 28 days.

Moreover the dried sample (C) has a porosity of 10.9 percent as compared to 0.5 percent for the 3 day sample (B) without drying. Even then, this porosity is on a sample which is allowed to set at room temperature for 2 hours before the drying is effected. When the 250° F. drying is effected immediately, the samples have even higher porosities as reported in U.S. Pat. No. 3,285,758.

EXAMPLE VIII

The desirability of having enough SPS to give about 7–9 parts of $P_2O_5$ per 100 parts of aggregate is illustrated as follows where the procedure of Example VII is repeated using proportions to give 7.5 parts of $P_2O_5$ and 6.0 parts of $P_2O_5$. The 7.5 parts gives an optimum consistency for casting and produces much superior results in porosity.

| Parts $P_2O_5$ | Porosity |
|---|---|
| 7.5 | 0.5% |
| 6.0 | 25.8% |

EXAMPLE IX

The adhesion of the quickset concrete is illustrated by tests where the mixtures prepared in Example VII are applied as indicated below and allowed to set for several days and then tested.

| | Beam Strength | Comments |
|---|---|---|
| Quickset concrete bonded ordinary concrete | 640 psi | All samples break through the ordinary concrete, and none at the joint or through the quickset concrete |
| Ordinary concrete bonded old ordinary concrete | 245 psi | |
| Quickset concrete bonded steel | *565 psi | |
| Material epoxy adhesive bonded to steel | *-0- psi | |

* These samples were exposed to 4-cycle freeze-thaw conditions.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims:

The invention claimed is:

1. A process for producing a fast-setting concrete structure, having a porosity of not more than about 5 percent, which is capable of load-bearing use within a few hours after mixing and which is produced and intended to be used in a situation of ordinary ambient atmospheric temperature of not more than about 150°F, comprising
   a. establishing a mixture of
      i. an aggregate containing at least about 10 percent by weight of magnesia and
      ii. ammonium phosphates in aqueous solution in an amount equal to between about 3 and about 10 parts by weight of $P_2O_5$ per 100 parts by weight of said aggregate, the composition of said phosphates in percent by weight being not more than about 40 percent orthophosphate and at least about 60 percent phosphates selected from the class consisting of pyrophosphate and polyphosphates whereof at least about 2 percent are polyphosphates;
   b. applying said mixture, promptly after establishment thereof, into a form defining a shaped open space to constitute said structure; and
   c. allowing said applied mixture to set in said defined open space at a temperature in the range from above the freezing point of said solution to about 150°F to produce a hard, strong structure within said few hours, all of the steps (a) and (b) and of said setting being effected while said mixture is maintained in a situation of ambient atmospheric temperature of not more than about 150°F and said applied mix and set structure being maintained in said situation for at least seven days after step (b) to develop hydraulic strength and said set structure being suitable for continuous load-bearing use in said situation.

2. A process according to claim 1, wherein said solution contains at least about 8 percent by weight ammoniacal nitrogen and at least about 30 percent by weight $P_2O_5$.

3. A process according to claim 1, wherein said solution contains about 8–12 percent by weight ammoniacal nitrogen and about 30–38 percent by weight $P_2O_5$.

4. A process according to claim 1, wherein said solution comprises about 10 percent by weight ammoniacal nitrogen, about 34 percent by weight $P_2O_5$, and about 50 percent by weight water.

5. A process according to claim 1, wherein the step of establishing said mixture comprises mixing said aggregate in dry state with a pre-established aqueous solution of said phosphates.

6. A process according to claim 1, wherein said aggregate contains at least about 10 percent magnesia.

7. A process for repairing a concrete structure having, as a defect, an open space therein, by filling the open space with a fast-setting concrete filler body directly bonded to the concrete structure and having a porosity of not more than about 5 percent, said process comprising
   a. establishing a mixture of
      i. an aggregate containing at least about 10 percent by weight of magnesia and
      ii. ammonium phosphates in aqueous solution in an amount equal to between about 3 and about 10 parts by weight of $P_2O_5$ per 100 parts by weight of said aggregate, the composition of said phosphates in percent by weight being not more than about 40 percent orthophosphate and at least about 60 percent phosphates selected from the class consisting of pyrophosphate and polyphosphates whereof at least about 2 percent are polyphosphates;
b. applying said mixture, promptly after establishment thereof, into an open space in and defined by a concrete structure and in direct contact with space-defining surface portions of the structure, and
c. allowing said applied mixture to set in said defined open space to produce a hard, strong filler body self-bonded to said structure surface portions while
d. continuously maintaining the mixture, throughout performance of steps (a), (b) and (c), in a situation of ambient atmospheric temperature of not more than about 150°F.

8. A process according to claim 7, wherein said concrete structure is an outdoor way having a substantially flat upper surface for supporting moving loads and said open space opens upwardly through said surface.

9. A structure produced by the process of claim 1, having a porosity of not more than about 5 percent.

10. A structure produced by the process of claim 7, including a concrete structure having an open space and a filler body disposed in and self-bonded to said concrete structure in said open space, said filler body having a porosity of not more than about 5 percent.

* * * * *